United States Patent [19]

Schramm

[11] 3,785,588

[45] Jan. 15, 1974

[54] TAPE TRANSPORT REEL SERVO SYSTEM

[75] Inventor: Eugene Charles Schramm, Boonton, N.J.

[73] Assignee: Bell Telephone Laboratories Incorporated, Murray Hill, N.J.

[22] Filed: Nov. 24, 1971

[21] Appl. No.: 201,649

[52] U.S. Cl. .................. 242/188, 242/75.51, 318/7

[51] Int. Cl. ..... B65h 59/38, G03b 1/04, G11b 1/52

[58] Field of Search .......242/188–191, 75.5–75.51; 200/61.13–61.18; 318/6, 7

[56] References Cited

UNITED STATES PATENTS

| | | | |
|---|---|---|---|
| 3,507,459 | 4/1970 | Campbell, Jr. | 242/190 |
| 3,491,968 | 1/1970 | Jennings et al. | 242/190 |
| 3,512,733 | 5/1970 | Ault | 242/190 |
| 3,206,133 | 9/1965 | Forster et al. | 242/190 |
| 3,643,891 | 2/1972 | Isbell | 242/189 |
| 3,488,017 | 1/1970 | Schatteman | 242/191 |

*Primary Examiner*—Leonard D. Christian
*Attorney*—R. Oliveras

[57] ABSTRACT

In a tape transport system including first and second rotatable tape storage reels, the nonlinear servo mechanism associated with the first reel is enabled during the fast wind mode to control the tape supply between the reels within a predetermined range, while the motor associated with the second reel is continuously energized in the forward direction to independently effect tape transfer from the first reel to the second reel, the nonlinear servo mechanism associated with the second reel being disabled during this mode. Tension means associated with the first reel maintains substantially constant tape tension independently of tape supply. It is a feature of this invention that the first and second reel motors' normal torque-speed characteristics are respectively modified to counteract the tape's dynamic tension and to provide the predetermined maximum linear tape speed.

2 Claims, 9 Drawing Figures

TAPE TRANSPORT REEL SERVO SYSTEM

FIELD OF THE INVENTION

This invention relates to tape transport systems and, in particular, to such systems which are capable of fast wind mode operation.

BACKGROUND OF THE INVENTION

Tape transport systems in which magnetic or paper tape is driven past an information processing station for the purposes of writing or reading are well known in the art. Prior to effecting these transducing operations, however, it is necessary to load tape from one storage reel to the other. In addition, while these two operations are being carried out, it is usually necessary to rapidly transfer tape from one reel to the other for further reading or writing. Finally, at the end of these two operations, it is usually necessary to unload the tape stored on one of the reels and rapidly transfer it to the other reel. These tape loading, transfer, and unloading operations are advantageously effected at high linear tape speeds and are generally designated as fast wind operations.

One major problem associated with these high speed tape handling operations is the introduction of unduly high tape tension which results in either tape damage or breakage. In certain prior art systems, the supplying and receiving reel motors are arbitrarily energized in the forward direction without regard to the amount of tape stored on either reel thereby yielding this unduly high tape tension.

It is therefore an object of this invention to provide a tape transport system which allows for the rapid transfer of tape from one storage reel to the other.

It is another object of this invention to provide a tape transport system which allows for quick loading and unloading of tape therefrom.

It is a further object of this invention to provide a tape transport system which allows for the fast forward wind and fast reverse wind operations without tape damage or breakage.

It is a still further object of this invention to provide a tape transport system which allows for the rapid transfer of tape from one storage reel to the other while simultaneously maintaining tape tension at a substantially constant value.

SUMMARY OF THE INVENTION

In a tape transport system according to the present invention, tape is rapidly transferred from a first rotatable tape storage reel to a second rotatable tape storage reel while tape tension is maintained at a substantially constant value independently of the tape supply between the reels. The system substantially comprises: means for sensing the tape supply between the reels; first motor energizing means responsive to the sensing means for either forwardly energizing, reversely energizing, or deenergizing the first reel motor when the tape supply either falls below a first predetermined value, rises above a second predetermined value, or stays within the first and second predetermined values, respectively; and second motor energizing means for continuously energizing the second reel motor in the forward direction.

In a specific embodiment of the present invention, the tape supply sensing means comprises first and second microswitches responsive to the motion of a cam rigidly attached to a rotatable multiple loop tape storage arm. Further, the tape tension maintaining means comprises a spring which is attached to one end of the arm and whose tension is substantially independent of arm position. In addition, first resistive means operate to modify the first reel motor's normal torque-speed characteristic while the motor is forwardly energized whereas second resistive means operate to modify the second reel motor's normal torque-speed characteristic in order to provide the predetermined maximum linear tape speed. The first resistive means effects a balance between the associated motor's output torque and the tape's dynamic tension.

It is an advantage of this invention that tape loading is effected simply and efficiently.

It is a feature of this invention that during the fast wind mode the nonlinear servo mechanism associated with the first reel motor is enabled while that associated with the second reel motor is disabled.

It is another feature of this invention that tape tension is maintained at a substantially constant value even though both reel motors are energized during the fast wind mode.

It is a further feature of this invention that the first and second motors' normal torque-speed characteristics are respectively modified to counteract the tape's dynamic tension and to provide the predetermined maximum linear tape speed.

DESCRIPTION OF THE DRAWING

The above and other objects, advantages, and features of this invention will be better appreciated by a consideration of the following detailed description and the drawing in which.

DETAILED DESCRIPTION

Figure 1:
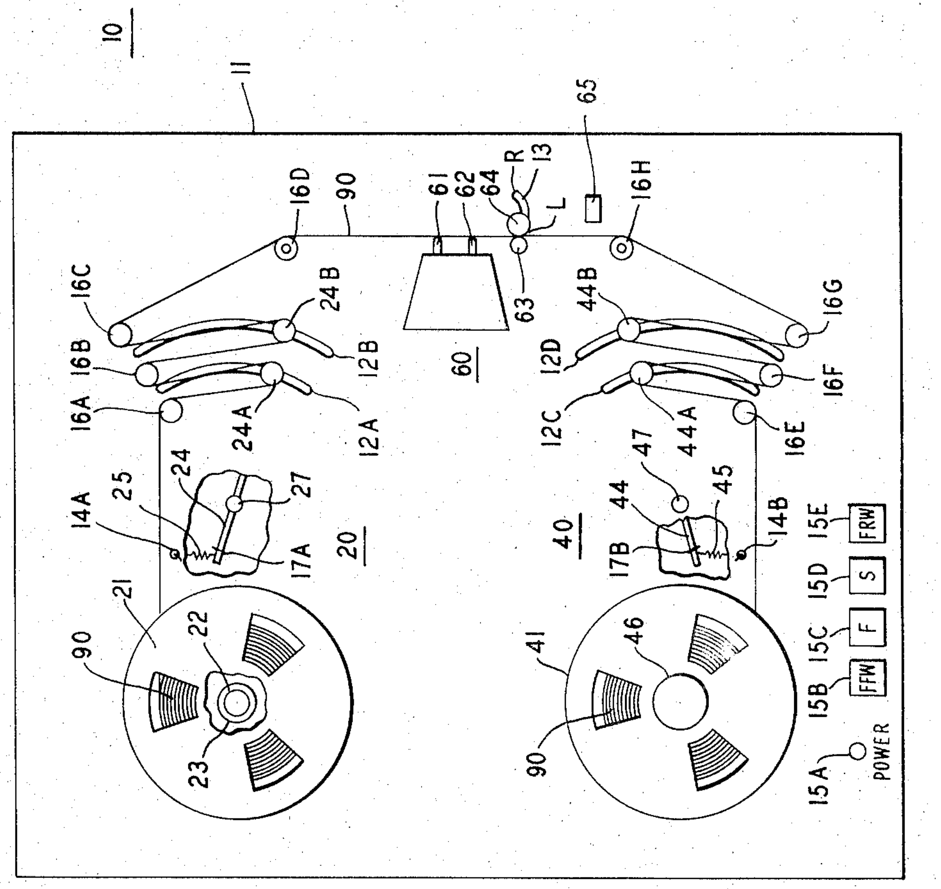
FIG. 1 is a partially fragmentary front view of a conventional tape transport of the prior art which utilizes multiple loop tape storage arms and which is shown in its write mode configuration.

Referring to FIG. 1, there is shown a partially fragmentary front view of conventional tape transport 10 in its write mode configuration. In most tape transport systems, the write mode and read mode configurations are substantially equivalent. Transport 10 generally comprises supply reel package 20, take-up reel package 40, and information processing station 60. Package 20 includes: supply reel 21 having tape 90 wound thereon; a motor-brake combination further including motor 22 and brake 23; and tape storage means further including multiple loop tape storage arm 24, tape guide rollers 24A-B mounted on arm 24, and stationary tape guide rollers 16A-D mounted on housing 11 of transport 10. Motor 22 is of the bidirectional DC type and has a specified normal torque-speed characteristic. Multiple loop tape storage arms are generally utilized in incremental stepping tape transport systems.

Figure 2:
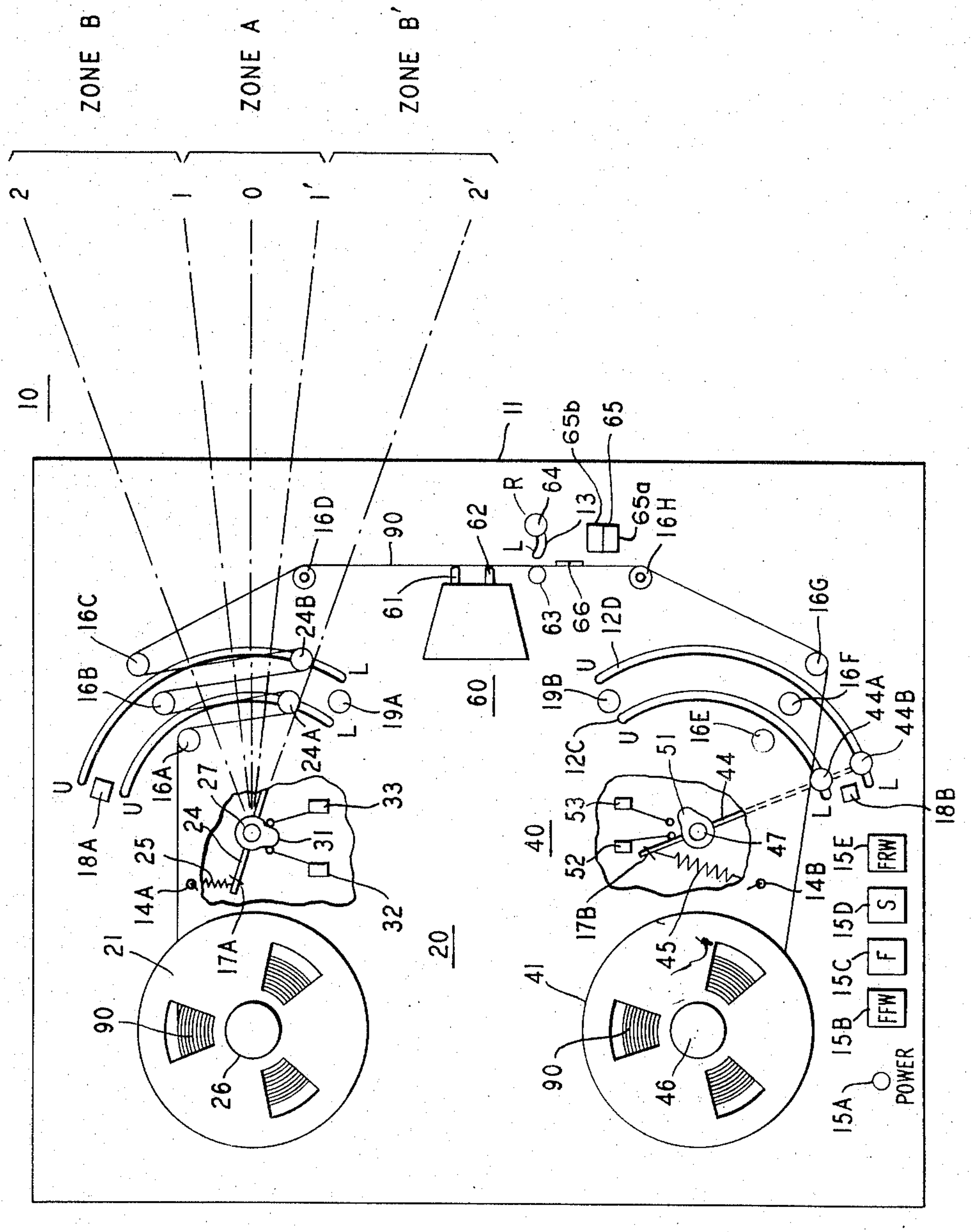
FIG. 2 is a partially fragmentary front view of the transport of FIG. 1 modified for fast forward wind operation according to the present invention.

Supply reel 21 is mounted on hub 26, shown in FIG. 2, which, in turn, is directly coupled to the shaft of motor 22. Motor 22 drives reel 21 in the clockwise or forward direction and in the counterclockwise or reverse direction. Brake 23, which impedes the motion of the shaft associated with motor 22, is preferably of the electromagnetically released friction type; in other words, energization of brake 23 causes the brake to be released whereas de-energization of brake 23 causes the brake to be applied. Arm 24 is rotatably mounted on bearing 27 which, in turn, is rigidly attached to housing 11. Rollers 24A-B are mounted on arm 24 via a relatively small diameter shaft, not shown, and move along the path defined by arcuate slots 12A-B which are cut into housing 11. Tension spring 25, which biases arm 24 in the clockwise direction about bearing 27, has its upper and lower ends respectively attached to point 14A of housing 11 and point 17A of arm 24. In most conventional tape transport systems, spring 25 is of the type whose tension varies with arm position. This, however, does not apply to the present invention, as will be hereinafter explained. As shown in FIG. 1, arm rollers 24A-B and stationary rollers 16A-D cooperate to form tape storage loops thereabout.

In a similar manner, package 40 includes: take-up reel 41 also having tape 90 wound thereon; a motor-brake combination further including motor 42 and brake 43, both not shown; and tape storage means further including multiple loop tape storage arm 44, tape guide rollers 44A-B mounted on arm 44, and stationary tape guide rollers 16E-H mounted on housing 11. Motor 42 is also of the bidirectional DC type and has a specified normal torque-speed characteristic. Take-up reel 41 is mounted on hub 46 which, in turn, is directly coupled to the shaft of motor 42. Brake 43 is similar to brake 23. Further, arm 44 is rotatably mounted on bearing 47 while arm rollers 44A-B are mounted on arm 44 and move along arcuate slots 12C-D as explained above. Finally, tension spring 45, which is similar to spring 25 and which biases arm 44 in the counterclockwise direction, is attached to point 14B of housing 11 and point 17B of arm 44.

Associated with information processing station 60 are write head 61, read head 62, the combination including capstan 63 and pinch roller 64, and sensor 65. Capstan 63 is rotatably driven by a motor, not shown, while pinch roller 64 is appropriately actuated along associated arcuate slot 13 of housing 11 by a solenoid mechanism or other mechanical means, also not shown. During the write mode, pinch roller 64 is located at the extreme left end L of slot 13; in other words, pinch roller 64 and capstan 63 engage each other thereby cooperating to drive tape 90, which can be of either the paper or magnetic type, past heads 61 and 62. Finally, sensor 65, which may include a light source and photoelectric sensing means, is utilized to detect beginning of tape (BOT) and end of tape (EOT) markers, which may be light reflective tabs, located on the blank side of tape 90. The use of sensor 65 for tape loading is discussed hereinafter.

Located on housing 11 of transport 10 are control buttons 15A-E. Buttons 15B and 15E are utilized to effect the fast forward wind (FFW) and fast reverse wind (FRW) operations, respectively, while button 15C is utilized to effect the forward (F) operation, which includes information writing and reading. Button 15D is utilized to effect the stop (S) operation which, in effect, brings to a halt the fast forward wind, forward, and fast reverse wind operations. Finally, button 15A is utilized to turn transport 10 ON or OFF. Transport 10 is advantageously designed so that pinch roller 64 and capstan 63 are normally disengaged except during the forward operation. The pressing of buttons 15A-E effects the closing of associated electrical contacts, as will be hereinafter explained.

During the forward operation, a supply reel servo mechanism, not shown, controls tape tension between supply reel 21 and the capstan-pinch roller combination, while a take-up reel servo mechanism, also not shown, controls tape tension between the capstan-pinch roller combination and take-up reel 41. Since the present invention is related to the fast wind operation wherein tape is rapidly transferred from one storage reel to the other, these prior art write mode reel servo mechanisms and the particular methods of transferring information to or from the heads will not be further discussed herein.

Referring now to FIG. 2, there is shown a partially fragmentary front view of tape transport 10, modified for fast forward wind (FFW) operation, in accordance with the present invention. Associated with supply reel package 20 is a nonlinear servo mechanism including: cam 31 which is fixedly attached to associated arm 24; microswitches 33 and 32 which respectively sense via cam 31 the angular position of arm 24 relative to limits 1 and 1'; arm lockout position engagement means 18A located adjacent to upper ends U of arcuate slots 12A-B; and tape-break bumper 19A located adjacent to lower ends L of slots 12A-B. In this embodiment, microswitches 32 and 33 are placed relative to the peripheral surface of cam 31 in such a manner that the two switches are never simultaneously actuated. Also, neither switch is actuated by cam 31 whenever arm 24 is located within the interval defined by limits 1 and 1'. Similarly, associated with take-up reel package 40 is a nonlinear servo mechanism including cam 51, microswitches 52 and 53, arm lockout position engagement means 18B located adjacent to lower ends L of slots 12C-D, and tape-break bumper 19B located adjacent to upper ends U of slots 12C-D.

Either arm can be placed in its associated lockout position by the mere manual rotation thereof. In such a case, the arm is kept in this position by its associated engagement means, such as a mechanical latch, not shown. Placing an arm in its lockout position, such being sensed by an associated lockout switch, not shown, disables the arm's associated nonlinear servo mechanism during the fast wind mode. This lockout switch can be a third microswitch attached to its associated arm and actuated by an associated cam. For instance, as shown in FIG. 2, arm 44 is located in its associated lockout position for fast forward wind operation. This, of course, eliminates the tape storage loop normally associated with the arm during the write mode. It is therefore apparent that while an arm is in its lockout position, its associated arm rollers and stationary rollers do not cooperate to form tape storage loops. This lockout feature will be further discussed with reference to FIGS. 4A through 4F.

The tape-break bumpers, which are advantageously made of rubber and which are rigidly attached to housing 11, serve to restrain the rotation of their associated arms in case of a tape break. For instance, if tape 90 were to break, then spring 25 would cause clockwise acceleration of arm 24. In such a case, the motion of arm 24 would immediately be halted by bumper 19A. The occurrence of a tape break could be sensed by a tape-break switch, not shown, which could be a fourth microswitch actuated by an associated cam. A similar explanation applies with respect to arm 44. Again, the tape-break bumper feature will be further discussed with reference to FIGS. 4A through 4F.

As shown in FIG. 2, during the fast forward wind mode, pinch roller 64 is disengaged, take-up arm 44 is located in its associated lockout position thereby disabling its associated nonlinear servo mechanism, while supply arm position and motion are determined by the amount of tape extending between the reels. It should be understood that during the fast forward wind mode tape 90 is rapidly transferred from supply reel 21 to take-up reel 41.

According to the embodiment of FIG. 2, arm 24 can be located in either of the following three zones: zone A which is defined by limits 1 and 1'; zone B which is defined by limits 1 and 2; zone B' which is defined by limits 1' and 2'. While theoretically no deadband is needed, it is included in the present embodiment in order to prevent simultaneous forward and reverse energization of the supply motor and to allow for switching transients. The deadband, therefore, is advantageously made as narrow as possible. Transport 10 is designed such that arm 24 is kept within limits 2 and 2' while tape tension remains substantially constant independently of the tape supply between the reels. The function of the supply arm's associated nonlinear servo mechanism is therefore to maintain arm 24 within these two limits. Accordingly, outer limits 2 and 2' are advantageously located as near as possible to stationary guide rollers 16A-C and bumper 19A, respectively. According to the present invention, springs 25 and 45 are of the type which exhibit a substantially constant tension independently of their extension. In the present case, therefore, spring tension is substantially independent of arm position at least while the arms are located within their associated outer limits. The following table provides qualitative relationships among tape tension, arm position, tape-loop supply, and spring tension:

| Tape Tension | Arm Position | Tape-Loop Supply | Spring Tension |
|---|---|---|---|
| Normal | Zone A | Normal | Normal |
| Normal | Zone B | Low | Normal |
| Normal | Zone B' | High | Normal |

It should be apparent that a substantially linear relationship exists between arm position and tape-loop supply.

Microswitch 33 is so located relative to cam 31 that counterclockwise rotation of arm 24 away from zone A and into zone B past limit 1, thereby indicating a low tape supply, causes actuation of the switch whereas microswitch 32 is so located relative to cam 31 that clockwise rotation of arm 24 away from zone A and into zone B' past limit 1', thereby indicating a high tape supply, causes actuation of this switch. In accordanc with the present invention, the supply motor's energization level remains substantially constant but its direction of application changes depending upon the location of the supply arm within zones B or B' thereby yielding the nonlinear control. Linear or proportional control, however, occurs in cases where the motor's energization level linearly varies with the arm's angular position.

Figure 3:
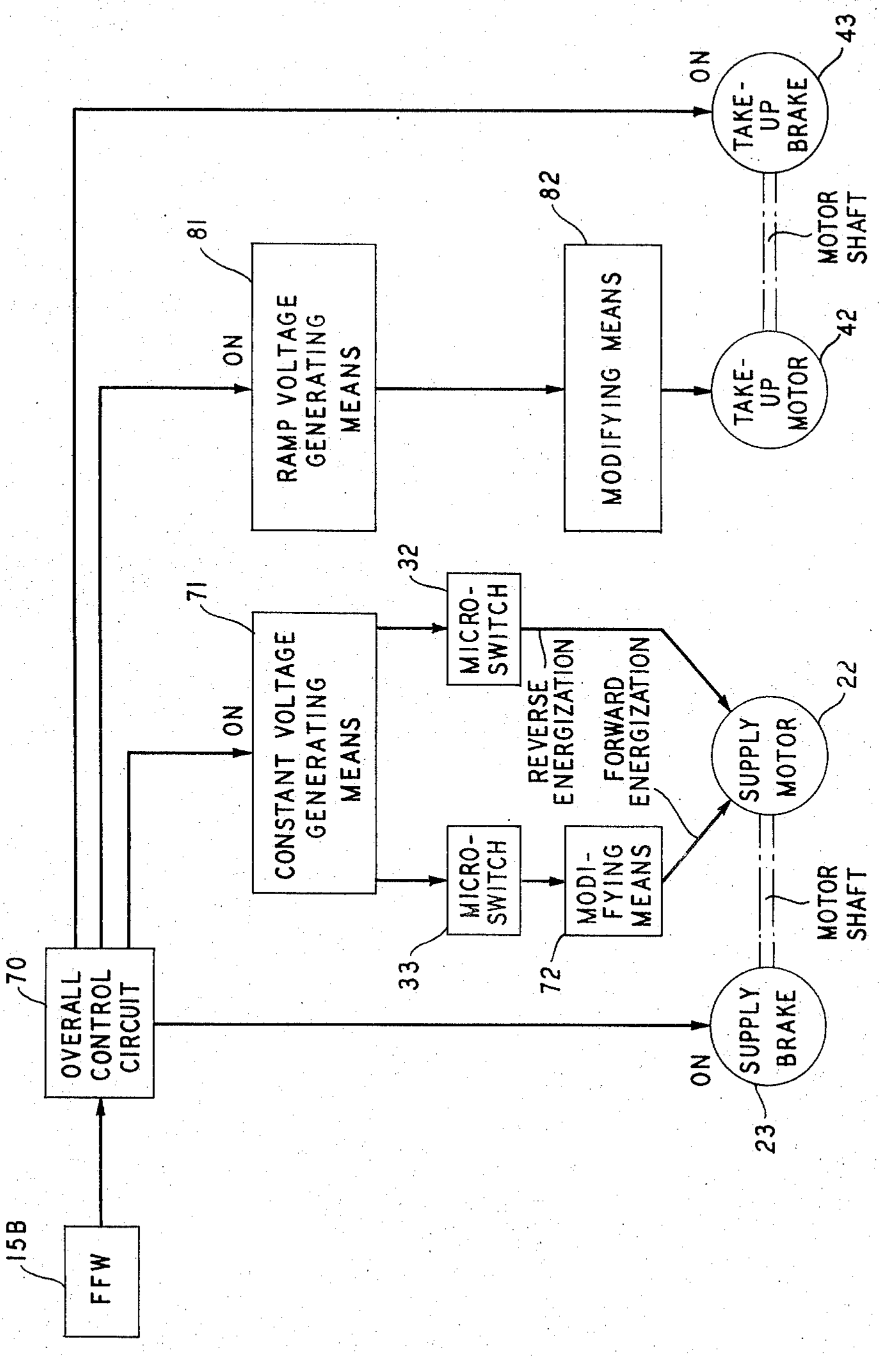
FIG. 3 is a block diagram representation of a circuit utilized to control the transport of FIG. 2 during the fast forward wind mode.

Referring now to FIG. 3, there is shown a block diagram representation of a circuit utilized to control tape transport 10 of FIG. 2 during the fast forward wind mode. The combination comprising constant voltage generating means 71, microswitches 33 and 32 which respectively sense the presence of arm 24 within zones B and B', and torque-speed characteristic modifying means 72, operates as a nonlinear servo mechanism to control supply motor 22. Further, the combination comprising ramp voltage generating means 81 and torque-speed characteristic modifying means 82 controls take-up motor 42.

It is apparent that during the fast forward wind mode, the nonlinear reel servo mechanism associated with supply reel package 20 undertakes complete control of the tape supply between the reels. As mentioned before, swtiches 33 and 32 respectively sense the presence of arm 24 within zones B and B'. Further, modifying means 72 and 82 respectively modify the normal torque-speed characteristics of motors 22 and 42. Also, generating means 71 is utilized to appropriately energize motor 22 in either the forward (clockwise) or reverse (counterclockwise) direction while generating means 81 appropriately provides accelerating and decelerating waveforms to take-up motor 42.

When fast forward wind button 15B is pressed, thereby closing its associated switch contacts, overall control circuit 70 activates constant voltage generating means 71 and ramp voltage generating means 81. Circuit 70 also energizes brakes 23 and 43 thereby releasing the brakes from the shafts of motors 22 and 42, respectively. Supply reel motor 22 is now either forwardly or reversely energized by generating means 71 through the combined action of cam 31 and either microswitch 33 or 32, respectively, in order to maintain arm 24 within limits 2 and 2'. In other words, forward or clockwise (CW) energization of supply motor 22 causes clockwise acceleration of supply reel 21 thereby supplying more tape to the tape loop supply and causing arm 24 to rotate away from zone B and into zone A, otherwise known as the deadband zone. Once arm 24 is located within deadband zone A, microswitch 33 is deactuated thereby allowing reel 21 to continue coasting in the clockwise direction. This is so since neither switch is actuated and therefore motor 22 is driven neither in the forward direction nor in the reverse direction except by the tape pulling on the reel. In a similar manner, reverse or counterclockwise (CCW) energization of supply motor 22 causes clockwise deceleration of supply reel 21 thereby supplying less tape to the tape loop supply and causing arm 24 to rotate away from zone B' and into zone A. In other words, the forward dynamic tape tension pulls tape out of the tape loop supply thereby causing arm 24 to rotate away from zone B' and into deadband zone A. Again, once arm 24 is located within deadband zone A, microswitch 32 is deactuated thereby allowing reel 21 to continue coasting in the clockwise direction. This alternating forward-reverse energization, of course, results in the oscillation of arm 24 about limits 1 and 1' of deadband zone A. It is apparent that CCW rotation of the supply reel may occur at the start of the FFW operation. Such will be the case when arm 24 is initially located in zone B'. However, both reels continuously rotate in the CW or forward direction during the substantial portion of the FFW operation.

Modifying means 72, which can include one resistor in series and one in shunt with motor 22, switches into operation only when supply motor 22 is energized in the forward direction thereby reducing the motor's normal dynamic output torque by an amount approximately equivalent to the value of forward dynamic tape tension. This, of course, prevents the motor from accelerating to too high an angular velocity. However, modifying means 72 switches out of operation when motor 22 is energized in the reverse direction thereby allowing the motor to provide its normal dynamic output torque. Further, when the tape's linear speed reaches the predetermined maximum linear speed, the supply motor's operation changes from the alternating forward-reverse energization to substantially continuous forward energization, except during those instances when the motor's angular velocity is too high. This substantially continuous forward energization, of course, tends to cause oscillation of arm 24 only about limit 1 of deadband zone A.

At take-up reel package 40, however, motor 42 is continuously accelerated in the forward or clockwise direction under the control of generating means 81 until the linear tape speed reaches its predetermined maximum range. In light of this, modifying means 82, which may also include one resistor in series and one resistor in shunt with motor 42, operates to modify the motor's normal torque-speed characteristic in such a manner that the linear tape speed range is satisfied regardless of the increasing tape radius and, thus, the increasing opposing torque caused by the dynamic tape tension. In order to prevent reverse or CCW rotation of the take-up reel at the beginning of the FFW operation, i.e., as a result of CCW rotation of the supply-reel motor, the initial voltage applied to the take-up motor is advantageously chosen to be a positive non-zero value.

When the switch contacts associated with fast forward wind button 15B are opened, such as by pressing stop button 15D, motor 42 is continuously decelerated under the control of generating means 81 while modifying means 82 continues to operate as explained before. Simultaneously therewith, the supply motor's operation changes from the substantially continuous forward energization to the original alternating forward-reverse energization. Therefore, arm 24 resumes to oscillate about limits 1 and 1' of dead-band zone A. When the energization level provided by generating means 81 to take-up motor 42 has decayed to a preselected bias value, which substantially balances the reverse static tape tension, a time delayed relay included in overall control means 70 de-energizes the two motors and the two brakes thereby causing the brakes to be applied to their associated motor shafts.

It is apparent from the previous discussion that the nonlinear servo mechanism associated with supply reel 21 is enabled during the fast forward wind mode to control the tape supply between the reels while ramp voltage generating means 81 effects tape transfer between the reels, the nonlinear servo mechanism associated with take-up reel 41 being disabled. Ramp waveforms are utilized to accelerate and decelerate the take-up motor in order to avoid extremely large transient oscillations which would otherwise occur if take-up motor power were simply switched ON and OFF.

The fast forward wind mode of transport 10 can be utilized to initially load tape thereon. To accomplish this, both arms are first placed in their associated lockout positions. Next, the new full supply reel is secured to hub 26 while the empty take-up reel is secured to hub 46. Tape is now pulled from the new supply reel, threaded along the appropriate path, and secured to the take-up reel. Supply arm 24 is now moved away from its lockout position and placed within limits 2 and 2'. Fast forward wind button 15B is then pressed. When the BOT marker, such as light reflective tab 66, on the tape passes sensor 65 further including light source **65*a* and photoelectric sensing means 65*b*, the switch contacts associated with button 15B are automatically opened thereby halting the fast forward wind operation. The write mode can thereafter be effected once take-up arm 44** is moved away from its lockout position and placed within its associated outer limits.

A second benefit is derived from the utilization of a ramp waveform. By making the acceleration time relatively long, the leader at the beginning of a newly threaded reel is passed before the tape reaches its predetermined maximum linear speed. Therefore, when the BOT marker is sensed thereby generating a stop command, the reels are stopped before a large amount of additional tape is passed.

Figures 4A, 4B, 4C, 4D, 4E, 4F:
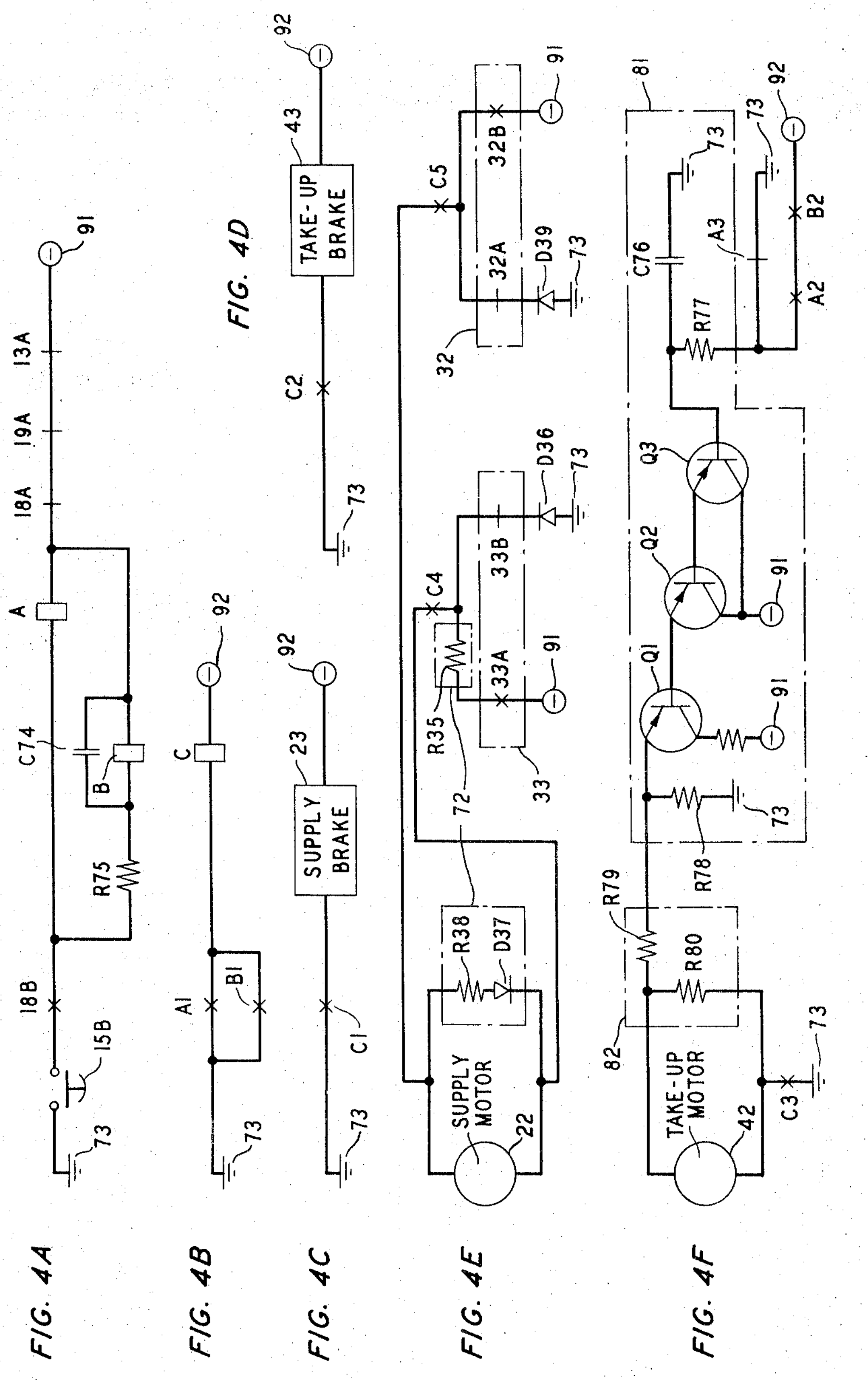
FIGS. 4A through 4F are schematic diagram representations of a circuit utilized to control the transport of FIG. 2 during the fast forward wind mode.

Referring now to FIGS. 4A through 4F, there is shown a schematic diagram representation of a circuit utilized to control tape transport 10 of FIG. 2 during the fast forward wind mode. The switch and relay contact states shown herein correspond to the disengaged state of pinch roller 64 but do not reflect the placing of take-up arm 44 in its associated lockout position. Overall control circuit 70 is generally shown in FIGS. 4A-D while constant voltage generating means 71 and ramp voltage generating means 81 are shown in FIGS. 4E and 4F, respectively.

Associated with relay winding A of FIG. 4A are normally open relay contact A1 of FIG. 4B and normally open relay contact A2 and normally closed relay contact A3 of FIG. 4F. Further, associated with relay winding B of FIG. 4A are normally open relay contact B1 of FIG. 4B and normally open relay contact B2 of FIG. 4F. Similarly, associated with relay winding C of FIG. 4B are normally open relay contacts C1-5 of FIGS. 4C-F. Further, microswitch 33 of FIG. 4E includes normally open switch contact 33A and normally closed switch contact 33B while microswitch 32 includes normally closed switch contact 32A and normally open switch contact 32B. In FIG. 4A there are also shown normally open switch contact 18B, which closes upon the placement of arm 44 in its lockout position, normally closed switch contact 18A, which opens upon the placement of supply arm 24 in its lockout position, normally closed switch contact 19A associated with supply arm 24, which opens upon the occurrence of a tape break, and normally closed switch contact 13A, which opens only upon the engagement of pinch roller 64 and capstan 63. Therefore, the placement of take-up arm 44 in its lockout position closes switch contact 18B. Transport 10 is now ready for fast forward wind operation.

Upon the closing of fast forward wind switch contact 15B, relay winding A is energized via the path comprising ground reference potential 73, operated switch contacts 15B and 18B, normally closed switch contacts 18A, 19A and 13A, and another reference potential such as DC source 91, as shown in FIG. 4A. Simultaneously therewith, relay winding C is energized via the path comprising ground 73, operated relay contact A1, and a third reference potential such as DC source 92. See FIG. 4B. Energization of relay winding A also causes the closing of relay contact A2 and the opening of relay contact A3, shown in FIG. 4F. The energization of relay winding C results in the further energization or release of supply brake 23 via the path comprising ground 73, operated relay contact C1, and DC source 92. Similarly, take-up brake 43 is energized or released via the path comprising ground 73, operated relay contact C2, and DC source 92. Refer to FIGS. 4C and 4D, respectively. Approximately 1.5 seconds later, relay winding B is energized via the path comprising ground 73, operated switch contacts 15B and 18B, normally closed switch contacts 18A, 19A and 13A, and DC source 91 as a result of the charging of capacitor C74 by way of resistor R75, as shown in FIG. 4A. This, of course, results in the closing of relay contact B1, which is in parallel with relay contact A1, and in the closing of relay contact B2, which is in series with relay contact A2. See FIGS. 4B and 4F.

With relay contacts A2 and B2 operated, power is therefore applied to ramp voltage generating circuit 81 of FIG. 4F via the path comprising ground 73, capacitor C76, resistor R77, operated relay contacts A2 and B2, and DC source 92. The ramp time constant of circuit 81 is determined by the combination including resistor R77 and capacitor C76. In addition to resistor R77 and capacitor C76, circuit 81 also includes transistor Q1, whose collector is biased via a resistor by DC source 91, transistors Q2 and Q3, whose collectors are biased by DC source 91, and resistor R78, which connects the emitter of transistor Q1 to ground 73. Further, the base of transistor Q1 is connected to the emitter of transistor Q2 while the base of transistor Q2 is connected to the emitter of transistor Q3. Also, the base of transistor Q3 is connected to the common junction of resistor R77 and capacitor C76. In this case, transistors Q1 through Q3 are of the PNP type. The voltage produced by ramp generating circuit 81 at the common mode of resistor R78 and the emitter of Q1 is therefore utilized to energize take-up motor 42 via the path comprising ground 73 and operated relay contact C3.

In response to the gradually increasing voltage across capacitor C76, there similarly occurs a gradual increase in the voltage across resistor R78. This gradually increasing voltage or ramp waveform forwardly energizes take-up motor 42 until a predetermined maximum voltage is applied thereto. Throughout this acceleration phase, modifying means 82, which includes resistors R79 and R80 respectively in series and in shunt with motor 42, operates to modify the take-up motor's normal torque-speed characteristic, as previously explained. In other words, take-up motor 42 is continuously accelerated in the clockwise direction until it reaches a predetermined angular velocity, during which means 82 operates to maintain linear tape speed within a predetermined maximum linear speed range. The detailed operation of circuit 81 will be obvious to those skilled in the art and, thus, will not be described herein.

Operated relay contacts C4 and C5 provide paths from microswitches 33 and 32, respectively, to supply motor 22, as shown in FIG. 4E. It will be recalled that switches 33 and 32 are operated by cam 31 which, in turn, is rigidly attached to supply arm 24. For forward or clockwise energization of supply motor 22, power is applied thereto via the path comprising ground 73, forward-biased diode D39, normally closed switch contact 32A, operated relay contacts C5 and C4, operated switch contact 33A, nd DC source 91. However, reverse or counterclockwise energization of motor 22 is effected via the path comprising ground 73, forward-biased diode D36, normally closed switch contact 33B, operated relay contacts C4 and C5, operated switch contact 32B, and DC source 91. During forward energization of motor 22, modifying means 72, which includes the series combination of resistor R38 and forward-biased diode D37 in shunt with motor 22 and resistor R35 in series therewith, operates to modify the supply motor's normal torque-speed characteristic, as previously explained. When not forwardly or reversely energized, motor 22 is de-energized thereby allowing it to continue coasting in the clockwise direction. It will be recalled that while linear tape speed is within its predetermined maximum range, the tendency at the supply motor is to have substantially continuous forward energization as opposed to the alternating forward-reverse energization which occurs during the acceleration and deceleration phases of the take-up reel motor.

The pressing of stop button 15D causes the opening of fast forward wind switch contact 15B thereby de-energizing relay winding A. This, of course, causes operated relay contacts A1 and A2 to open and operated relay contact A3 to close thereby removing power from ramp voltage generating circuit 81 and initiating the discharge of capacitor C76 via the path comprising resistor R77, normally closed relay contact A3, and ground 73. This, in turn, causes the voltage applied to take-up motor 42 to gradually decrease in response to the gradually decreasing voltage applied to circuit 81 by capacitor C76. In other words, take-up motor 42 gradually decelerates. Approximately 1 second after the de-energization of relay winding A, relay winding B is de-energized as a result of the discharge of capacitor C74 via resistor R75. This causes operated relay contact B1 to revert to the normally open state thereby de-energizing relay winding C. Finally, the supply and take-up motor energization paths are opened and brakes 23 and 43 are applied due to the opening of relay contacts C1 through C5.

To effect the fast reverse wind operation wherein tape 90 is rapidly transferred from take-up reel 41 to supply reel 21, pinch roller 64 again must be in its normally disengaged position and supply arm 24 is placed in its lockout position, while take-up arm 44 is initially placed within its associated outer limits. Similar apparatus is utilized and similar logic functions are carried out whereby motor 42 is forwardly and reversely energized in the counterclockwise and clockwise directions, respectively while motor 22 is forwardly energized in the counterclockwise direction.

While the arrangement according to this invention for rapidly transferring tape from a first storage reel to a second storage reel while maintaining tape tension at a substantially constant value has been described in terms of a specific embodiment, it will be apparent to those skilled in the art that many modifications are possible within the spirit and scope of the disclosed principle.

I claim:

1. In a tape transport system:

first and second rotatable tape storage reels having tape wound thereon and extending therebetween;
first and second bidirectional motors being drivingly connected to said first and second reels, respectively;
means associated with said first reel for storing a supply of said extended tape, said supply falling within a predetermined range occurring between a first and a second valve;
first means for energizing said first motor in either the forward or reverse direction to control said tape supply within said predetermined range, said first means comprising:
tape supply storing means comprising:
a rotatable multiple loop tape storage arm having associated therewith a tape loop supply which varies with the arm's angular position;
means for detecting the angular position of said arm including:
a cam located at the center of rotation of said arm and rotatable therewith,
and first and second microswitches responsive to the motion of said cam, each switch including normally open and normally closed contacts,
said first and second microswitches being actuated by said cam when said tape supply reaches said first and second predetermined values, respectively,
and means rotatably biasing said arm in a direction which tends to cause said tape loop supply to increase; means--including a forward energizing conduction
path comprising the series combination of a first reference potential, a first forward-biased diode, the normally closed contact of said second microswitch, the operated contact of said first microswitch, and a second reference potential less than said first reference potential--responsive to said tape supply storing means for forwardly energizing said first motor when the supply is below said first predetermined value;
means--including a reverse energizing conduction path comprising the series combination of said first reference potential, a second forward-biased diode, the normally closed contact of said first microswitch, the operated contact of said second microswitch, and said second reference potential--for reversely energizing said first motor when the supply is above said second predetermined value greater than said first value;
said first motor being deenergized and therefore allowed to continue coasting in the forward direction when the supply is within said first and second predetermined values;
means associated with said first reel for maintaining tape tension and a substantially constant value independent of tape supply; and
second means for continuously energizing said second motor in a forward direction only to rapidly transfer tape from said first reel to said second reel.

2. The tape transport system of claim 1 also including a resistor in series with said first motor and the series combination of a resistor and a diode in shunt with said first motor, said diode being forward-biased and therefore conducting when said first motor is forwardly energized whereby the motor's normal dynamic output torque is reduced by an amount approximately equivalent to said tape tension value.

* * * * *